United States Patent [19]
Hitomi et al.

[11] Patent Number: 5,080,051
[45] Date of Patent: Jan. 14, 1992

[54] INTAKE SYSTEM FOR ENGINE

[75] Inventors: Mitsuo Hitomi; Toshihiko Hattori; Mikihito Fujii, all of Hiroshima, Japan

[73] Assignee: Mazda Motor Corporation, Hiroshima, Japan

[21] Appl. No.: 701,066

[22] Filed: May 16, 1991

[30] Foreign Application Priority Data

May 17, 1990 [JP] Japan .................. 2-128173

[51] Int. Cl.$^5$ ............................. F02M 35/10
[52] U.S. Cl. ..................... 123/52 MV; 123/52 ML
[58] Field of Search ........ 123/52 M, 52 MV, 52 ML, 123/52 MC

[56] References Cited

U.S. PATENT DOCUMENTS

| | | | |
|---|---|---|---|
| 4,615,324 | 10/1986 | Choushi et al. | 123/52 MV |
| 4,619,226 | 10/1986 | Ueda et al. | 123/52 MB |
| 4,829,941 | 5/1989 | Hitomi et al. | 123/52 ML |
| 4,846,117 | 7/1989 | Hitomi et al. | 123/52 MV |

Primary Examiner—David A. Okonsky
Attorney, Agent, or Firm—Sixbey, Friedman, Leedom & Ferguson

[57] ABSTRACT

A multiple-cylinder engine has first and second groups of cylinders, the firing order being set so that the cylinders in each group do not fire one after another. An intake system for the engine has first and second groups of discrete intake passages which communicate with the respective cylinders in the first and second groups at their downstream ends and with first and second branch intake passage at their upstream ends. A circular passage communicates with the discrete intake passages at their intermediate portions so that all the discrete intake passages communicate with each other through the circular passage, and an on-off valve opens the circular passage when the engine speed is higher than a predetermined value and closes the same when the engine speed is not higher than the predetermined value. The length of each discrete intake passage is such that a first inertia tuning is obtained at a first engine speed lower than a maximum allowable engine so long as the discrete intake passages are not communicated with the circular passage, and the length of the part of each discrete intake passage downstream of the circular passage is such that a second inertia tuning is obtained at a second engine speed higher than the maximum allowable engine so long as the discrete intake passages are communicated with the circular passage.

4 Claims, 4 Drawing Sheets

INTAKE SYSTEM FOR ENGINE

BACKGROUND OF THE INVENTION

1. Field of the Invention

This invention relates to an intake system for an engine, and more particularly to an intake system for an engine which is arranged for supercharging the engine by the kinetic effect of intake air.

2. Description of the Prior Art

Various multiple-cylinder engines are known which are arranged to increase the charging efficiency, and thereby the engine output torque, by the kinetic effect of intake air such as an inertia effect or a resonance effect of intake air. For example, in the multiple-cylinder engine disclosed in Japanese Unexamined Patent Publication No. 62(1987)-121828, the cylinders are divided into two groups so that the cylinders in each group do not fire one after another, discrete passages for the cylinders in each group are connected to an enlarged volume chamber, the enlarged volume chambers for the respective cylinder groups are connected to the downstream ends of a pair of long resonance passages which are connected to each other at their upstream ends, and the enlarged volume chambers are connected by a short resonance passage which is provided with an on-off valve.

In such an engine, supercharging effect by the kinetic effect of intake air can be obtained over a wide engine speed range by opening and closing the on-off valve according to the operating condition of the engine. For example, when the on-off valve is closed in a low engine speed range, an air column between the intake port for each cylinder and the upstream end of the long resonance passage is oscillated by a negative pressure wave generated in the intake stroke of the cylinder and when the engine speed tunes to the natural frequency of the air column, the amplitude of the oscillation of the air column is maximized and a resonance supercharging effect is obtained, whereby the charging efficiency is increased. When the on-off valve is opened in a high engine speed range, an air column between the intake port for each cylinder and the enlarged volume chamber for the other cylinder group with which the cylinder is communicated by way of the short resonance passage is oscillated by said negative pressure wave and when the engine speed tunes to the natural frequency of the air column, the amplitude of the oscillation of the air column is maximized and another resonance supercharging effect is obtained, whereby the charging efficiency is increased. When the engine speed increases further higher, a negative pressure generated at the beginning of the intake stroke of each cylinder is reflected as a positive pressure wave at the enlarged volume chamber and propagates downstream and acts on the same cylinder at the end of the intake stroke to supercharge the cylinder by an inertia effect of the intake air. The inertia supercharging effect is maximized at a particular engine speed which is determined mainly according to each discrete passage.

Generally the resonance supercharging effect and the inertia supercharging effect are not independent of each other but have a close relation to each other by way of, for instance, the passage length of the intake system as a parameter. That is, when an inertia supercharging effect is obtained at a certain engine speed, a resonance supercharging effect corresponding to the inertia supercharging effect is obtained at a particular engine speed lower than the certain engine speed.

On the other hand, it has been known that a high positive pressure is produced and an excellent resonance supercharging effect can be obtained when the engine speed is near the resonance tuning point while as the engine speed moves away from the resonance tuning point, a negative pressure sharply increases. This tendency is enhanced as the resonance tuning engine speed increases. Especially when the inertia tuning point is set near the maximum allowable engine speed, the resonance supercharging effect which is obtained at an engine speed lower than the upper limit adversely affects the inertia supercharging effect which is to be obtained near the upper limit and the engine output power cannot be satisfactorily increased by the inertia supercharging effect near the maximum allowable engine speed.

SUMMARY OF THE INVENTION

In view of the foregoing observations and description, the primary object of the present invention is to provide an intake system for a multiple-cylinder engine which can improve the engine output performance especially in the high engine speed range by a kinetic effect of intake air.

In accordance with one aspect of the present invention, there is provided an intake system for a multiple-cylinder engine having first and second groups of cylinders, the firing order being set so that the cylinders in each group do not fire one after another, said intake system comprising a first group of discrete intake passages which communicate with the respective cylinders in the first group at their downstream ends and with a first branch intake passage at their upstream ends, a second group of discrete intake passages which communicate with the respective cylinders in the second group at their downstream ends and with a second branch intake passage at their upstream ends, the first and second branch intake passages merging into a common intake passage which opens to the atmosphere at its upstream end, a circular passage which communicates with the discrete intake passages at their intermediate portions so that all the discrete intake passages communicate with each other through the circular passage, and an on-off valve means which opens to cause the discrete intake passages to communicate with the circular passage when the engine speed is higher than a predetermined value and closes to break the communication between the discrete intake passages and the circular passage when the engine speed is not higher than the predetermined value, the length of each discrete intake passage being such that a first inertia tuning is obtained at a first engine speed lower than a maximum allowable engine so long as the discrete intake passages are not communicated with the circular passage, and the length of the part of each discrete intake passage downstream of the circular passage being such that a second inertia tuning is obtained at a second engine speed higher than the maximum allowable engine so long as the discrete intake passages are communicated with the circular passage.

In accordance with another aspect of the present invention, there is provided an intake system for a multiple-cylinder engine having first and second groups of cylinders, the firing order being set so that the cylinders in each group do not fire one after another, said intake system comprising a first group of discrete intake passages which communicate with the respective cylinders in the first group at their downstream ends and with a first branch intake passage at their upstream ends, a second group of discrete intake passages which communicate with the respective cylinders in the second group at their downstream ends and with a second branch intake passage at their upstream ends, the first and second branch intake passages merging into a common intake passage which opens to the atmosphere at its upstream end, a circular passage which communicates with the discrete intake passages at their intermediate portions so that all the discrete intake passages communicate with each other through the circular passage, and an on-off valve means which opens to cause the discrete intake passages to communicate with the circular passage when the engine speed is higher than a predetermined engine speed and closes to break the communication between the discrete intake passages and the circular passage when the engine speed is not higher than the predetermined engine speed, the length of each of the discrete intake passages, the position of the junction at which the circular passage communicates with each of the discrete intake passage and said predetermined engine speed being set so that a first resonance tuning, an inertia tuning and a second resonance tuning are obtained in this order as the engine speed increases up to a maximum allowable engine speed.

In the intake system of the present invention, in a low engine speed range where the on-off valve means is closed, a resonance system is formed by the discrete intake passages for the cylinders in the respective cylinder groups and the branch intake passages, and when the engine speed tunes to the natural frequency of air column oscillation in the resonance system, the amplitude of the pressure oscillation is maximized and a resonance supercharging effect in the low engine speed range is obtained. When the engine speed increases with the on-off valve means closed, a negative pressure wave generated in the intake stroke of each cylinder propagates upstream through the discrete intake passage for the cylinder and reflected at the upstream end of the discrete intake passage as a positive pressure wave, which propagates downstream toward the cylinder. The positive pressure wave reaches the cylinder at the end of the intake stroke and an inertia supercharging effect is obtained. In accordance with the present invention, the length of each of the discrete intake passages is set so that the inertia supercharging effect is obtained at a first engine speed lower than the maximum allowable engine speed.

When the on-off valve means opens, the circular passage forms the resonance system together with the discrete intake passages for each cylinder group and the branch intake passage for the discrete intake passages.

Generally, in the case of the resonance supercharging effect, the resonance tuning engine speed changes depending on the volume of the part of each discrete intake passage downstream of the junction at which the circular passage communicates with the discrete intake passage, the length of the intake passage upstream of the junction and the mean cross-sectional area of the intake passage upstream of the junction. For example, as the effective volume of the part of each discrete intake passage downstream of the junction reduces, as the length of the intake passage upstream of the junction reduces and as the mean cross-sectional area of the intake passage upstream of the junction increases, the resonance tuning engine speed increases.

In this case, the circular passage functions as a mere passage and the mean cross-sectional area of the intake passage upstream of the junction increases when the on-off valve means opens, the resonance tuning engine speed increases so long as the other parameters do not change by a large amount. Since, in the intake system of the present invention, the length of the part of each discrete intake passage downstream of the circular passage is set so that the inertia tuning related to the resonance tuning is obtained at a second engine speed higher than the maximum allowable engine so long as the discrete intake passages are communicated with the circular passage, the supercharging effect by the resonance tuning is obtained near the maximum allowable engine speed and accordingly, the output performance of the engine in the high engine speed range can be increased without depending on the inertia supercharging effect.

Further, since the length of each of the discrete intake passages, the position of the junction at which the circular passage communicates with each of the discrete intake passage and said predetermined engine speed are set so that a first resonance tuning, an inertia tuning and a second resonance tuning are obtained in this order as the engine speed increases up to a maximum allowable engine speed, supercharging effect by the kinetic effect of intake air can be obtained over a wide engine speed range.

DESCRIPTION OF THE PREFERRED EMBODIMENT

Figure 1:
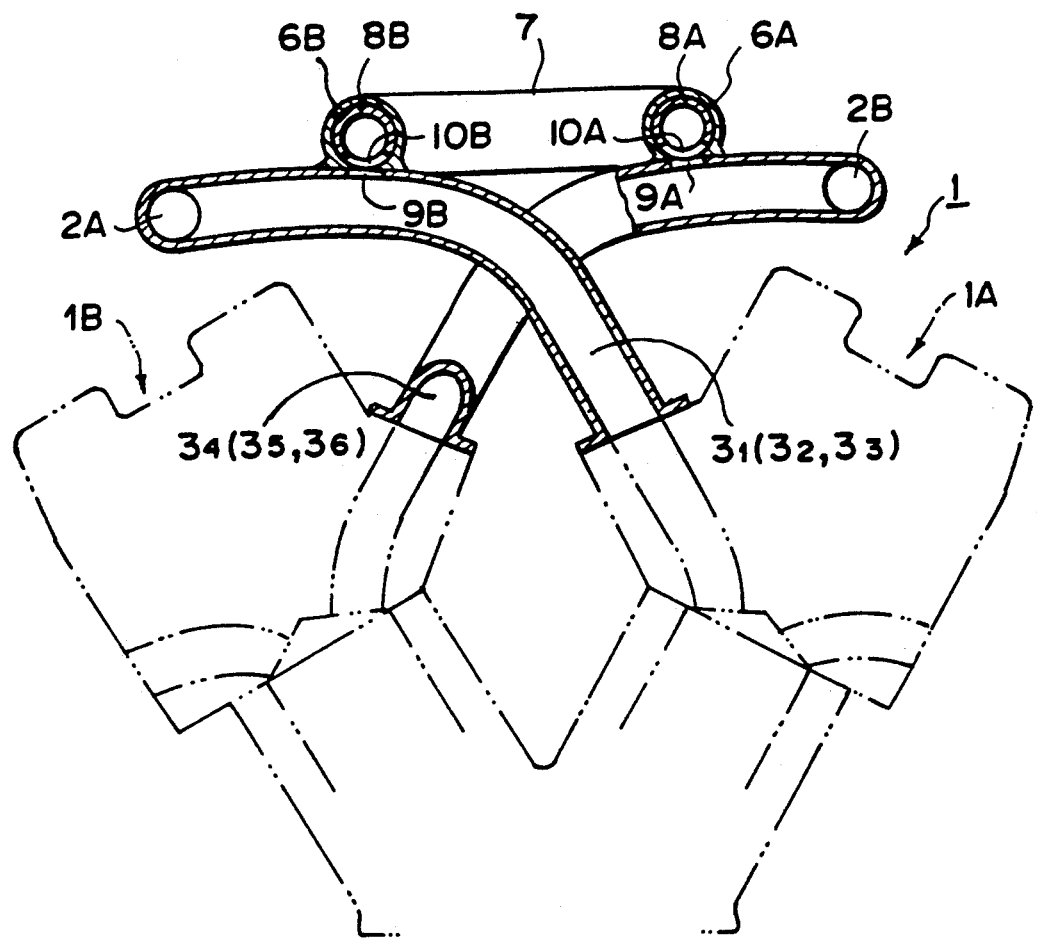
FIG. 1 is a schematic front view partly in cross-section of an intake system in accordance with an embodiment of the present invention.
Figure 2:
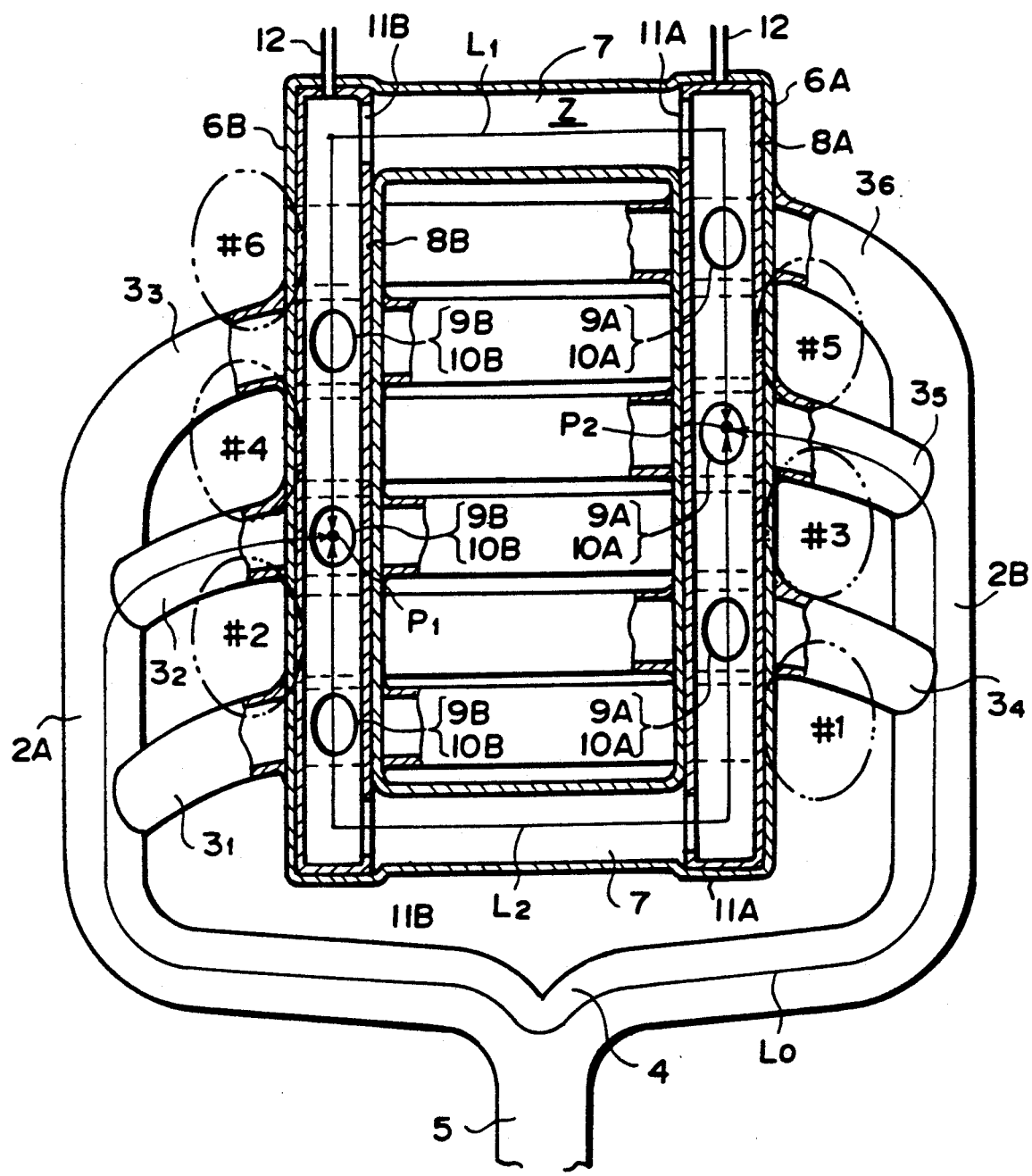
FIG. 2 is a plan view partly in cross-section of the intake system.

In FIGS. 1 and 2, a V-6 engine 1 provided with an intake system in accordance with an embodiment of the present invention has first and second cylinder banks 1A and 1B. First, third and fifth cylinders #1, #3 and #5 are formed in the first cylinder bank 1A and second, fourth and sixth cylinders #2, #4 and #6 are formed in the second cylinder bank 1B. The firing order is #1-#6-#3-#4-#5-#2, and accordingly, the cylinders in each cylinder bank do not fire one after another.

A first branch intake passage 2A extends substantially in parallel to the cylinder rows above the second cylinder bank 1B and a second branch intake passage 2B extends substantially in parallel to the cylinder rows above the first cylinder bank 1B. First to third discrete intake passages $3_1$ to $3_3$ respectively connect the first, third and fifth cylinders #1, #3 and #5 in the first cylinder bank 1A to the first branch intake passage 2A above the second cylinder bank 1B, and fourth to sixth discrete intake passages $3_4$ to $3_6$ respectively connect the second, fourth and sixth cylinders #2, #4 and #6 in the second cylinder bank 1B to the second branch intake passage 2B above the first cylinder bank 1A. The first to sixth discrete intake passages $3_1$ to $3_6$ are substantially equal to each other in length. As clearly shown in FIG. 1, each of the first to third discrete intake passages extends from the first branch intake passage 1A substantially horizontally toward the first cylinder bank 1A and then curves downward toward the corresponding cylinder. Similarly, each of the fourth to sixth discrete intake passages extends from the second branch intake passage 1B substantially horizontally toward the second cylinder bank 1B and then curves downward toward the corresponding cylinder.

The upstream side end portions of the first and second branch intake passages 2A and 2B merges together at a junction 4 into a common intake passage 5.

A first valve casing 6A extends above the upstream side portions of the fourth to sixth discrete intake passages $3_4$ to $3_6$, which extend substantially horizontally, across them and is fixed to them. The first valve casing 6A is a tubular member having an inner space which forms a part of a circular passage which will be described later and is communicated with the discrete intake passages $3_4$ to $3_6$ respectively by way of communicating holes 9A. A second valve casing 6B extends above the upstream side portions of the first to third discrete intake passages $3_1$ to $3_3$, which extend substantially horizontally, across them and is fixed to them. The second valve casing 6B is a tubular member having an inner space which forms a part of the circular passage and is communicated with the discrete intake passages $3_1$ to $3_3$ respectively by way of communicating holes 9B. The valve casings 6A and 6B are communicated with each other by a pair of communicating passages 7 at their opposite ends, whereby a circular passage Z is defined by the inner spaces of the valve casings 6A and 6B and the communicating passages 7. The cross-sectional area of each of the discrete intake passages $3_1$ to $3_6$ and the cross-sectional area of the circular passage Z are substantially equal to each other.

First and second rotary valves 8A and 8B are respectively fitted in the first and second valve casings 6A and 6B to be rotatable relative to the valve casings 6A and 6B about the longitudinal axis thereof. The first rotary valve 8A has three openings 10A which are adapted to be aligned with the communicating holes 9A to communicate the inner space of the first valve casing 6A with the respective discrete intake passages $3_4$ to $3_6$ and a pair of openings 11A which are adapted to be aligned with the communicating passages 7 to communicate the inner space of the first valve casing 6A with the communicating passage 7. The first rotary valve 8A is fixed to a rotary shaft 12 which projects outside through an end face of the first valve casing 6A. Similarly the second rotary valve 8B has three openings 10B which are adapted to be aligned with the communicating holes 9B to communicate the inner space of the second valve casing 6B with the respective discrete intake passages $3_1$ to $3_3$ and a pair of openings 11B which are adapted to be aligned with the communicating passages 7 to communicate the inner space of the second valve casing 6B with the communicating passages 7. The second rotary valve 8B is fixed to another rotary shaft 12 which projects outside through an end face of the second valve casing 6B.

When the first and second rotary valves 8A and 8B are in the position shown in FIG. 2 where they communicate the inner spaces of the first and second valve casings 6A and 6B with the first to sixth discrete intake passages $3_1$ to $3_6$ and the communicating passages 7, the first to sixth discrete intake passages $3_1$ to $3_6$ are all communicated with each other through the circular passage Z.

The inertia tuning engine speed $N_{f1}$ at which the inertia supercharging effect is maximized when the circular passage Z is closed (will be referred to as "the first inertia tuning engine speed $N_{f1}$", hereinbelow) can be approximated according to the following formula.

$$N_{f1} = \theta/6 \cdot a/2\pi \cdot \sqrt{[f/(l \cdot Vm)]}$$

wherein l represents the equivalent passage length of each discrete intake passage (meter), $\theta$ represents the intake valve opening time (°), a represents the sonic speed (m/s), f represents the mean cross-sectional area of the discrete intake passage and Vm represents the mean volume of the combustion chamber during the intake stroke.

Since the intake valve opening time is generally 240° in a V-6 engine, the above formula can be written as follows.

$$N_{f1} = 40 \cdot a/2\pi \cdot \sqrt{[f/(l \cdot Vm)]}$$

The inertia tuning engine speed $N_{f2}$ at which the inertia supercharging effect is maximized when the circular passage Z is opened (will be referred to as "the second inertia tuning engine speed $N_{f2}$", hereinbelow) can be approximated according to the following formula.

$$N_{f2} = 40 \cdot a/2\pi \cdot \sqrt{[f/(lo \cdot Vm)]}$$

wherein lo represents the equivalent passage length of the part of each discrete intake passage downstream of the circular passage Z.

In this embodiment, the equivalent passage length l of each of the discrete intake passages $3_1$ to $3_6$ is set so that the first inertia tuning engine speed $N_{f1}$ is lower than the maximum allowable engine speed Nmax, and the equivalent passage length lo of the part of each discrete intake passage downstream of the circular passage Z is set so that the second inertia tuning engine speed $N_{f2}$ is higher than the maximum allowable engine speed Nmax.

Further, in this embodiment, the equivalent length Lo of the part of the intake passage which joins the point P1 at which the second discrete intake passage $3_2$ is communicated with the circular passage Z and the point P2 at which the fifth discrete intake passage $3_5$ is communicated with the circular passage Z via the junction 4, the equivalent passage length L1 of the upper part of the circular passage Z (the part of the circular passage Z above the points P1 and P2 as seen in FIG. 2) and the equivalent passage length L2 of the lower part of the circular passage Z (the part of the circular passage Z below the points P1 and P2 as seen in FIG. 2) are set to be equal to each other.

Figure 3:
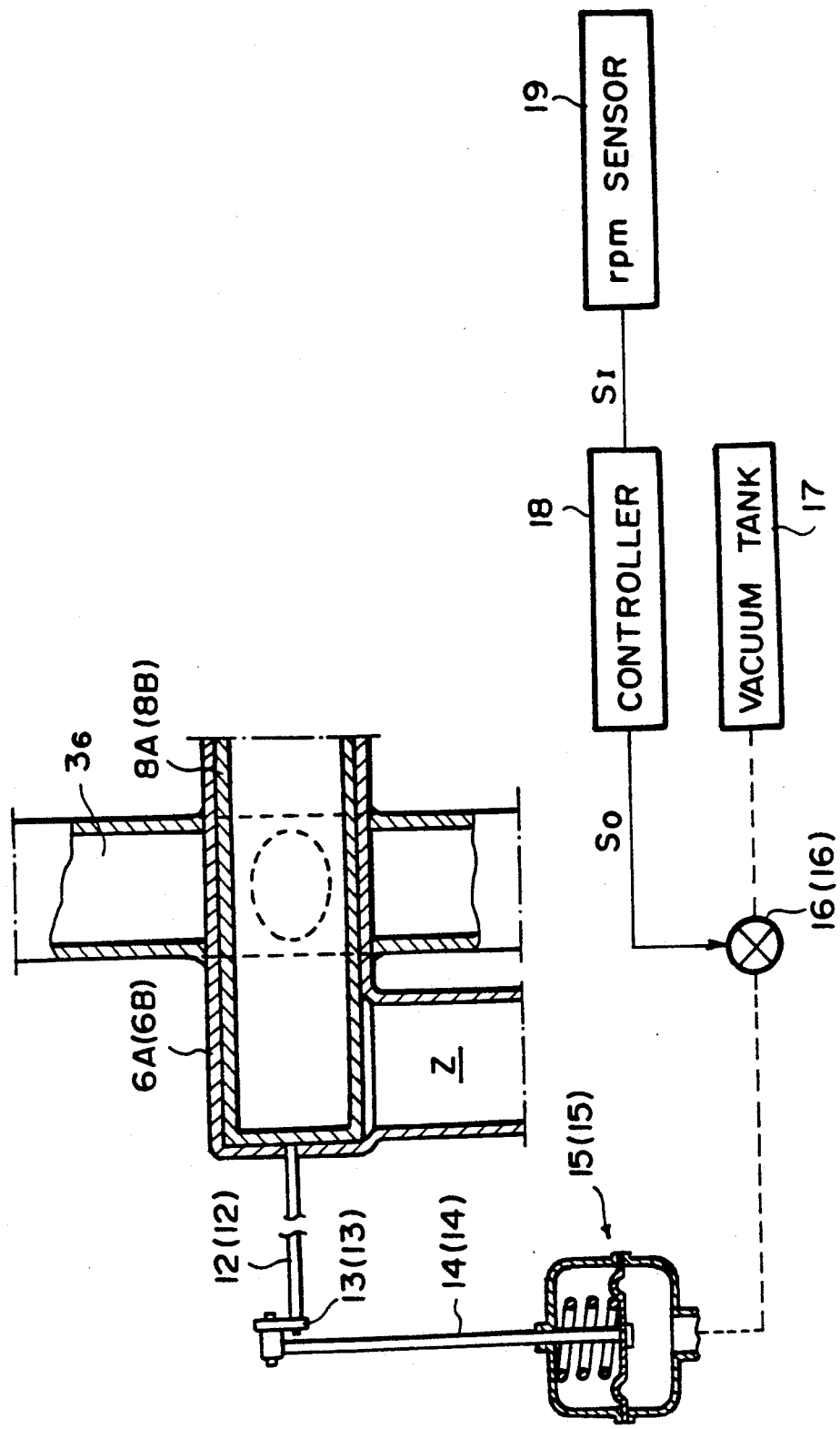
FIG. 3 is a view showing the mechanism for open and close the rotary valve.

As shown in FIG. 3, the intake system of this embodiment is further provided with actuators 15 which drive the rotary shafts 12 by way of levers 13 and rods 14, a vacuum tank 17 which supplies the actuators 15 with working negative pressure by way of three-way solenoid valves 16, and a controller 18 which controls the three-way solenoid valve 18. The controller 18 receives an engine speed signal S1 from an engine speed sensor 19 and outputs a control signal So to control the solenoid valves 16 to cause, by way of the actuators 15, the first and second rotary valves 8A and 8B to break the communication between the discrete intake passages $3_1$ to $3_6$ and the circular passage Z when the engine speed is lower than a predetermined engine speed N1 and to communicate the discrete intake passages $3_1$ to $3_6$ with the circular passage Z when the engine speed is higher than the predetermined engine speed N1.

The operation of the intake system of this embodiment will be described with reference to FIG. 4, hereinbelow.

In the low engine speed range where the engine speed is lower than the predetermined engine speed N1, the discrete intake passages $3_1$ to $3_6$ are not communicated with each other as described above. Accordingly, in the low engine speed range, a negative pressure wave generated in the intake stroke of each cylinder produces a pressure oscillation having a frequency proportional to the engine speed in a resonance space where the first and second branch intake passages 2A and 2B serve as a resonance passage. When the pressure oscillation tunes to the natural frequency of the air column oscillation in the resonance space, the pressure oscillation is maximized and the charging efficiency is increased by the resonance supercharging effect, whereby a first peak appears in the engine output characteristic curve near the engine speed $N_{R1}$ at which the pressure oscillation tunes to the natural frequency of the air column oscillation in the resonance space as shown in FIG. 4.

When the engine speed increases in the state, an inertia supercharging effect can be obtained with the upstream end of each discrete intake passage serving as an end open to the atmosphere, whereby a second peak appears in the engine output characteristic curve near the first inertia tuning engine speed $N_{I1}$ described above.

When the engine speed further increases and exceeds the predetermined engine speed N1, the first and second rotary valves 8A and 8B are operated to communicate the discrete intake passages $3_1$ to $3_6$ with the circular passage Z. Accordingly a resonance space where a passage portion comprising the part of the discrete intake passages $3_1$ to $3_6$ upstream of the circular passage Z and the first and second branch intake passages 2A and 2B and the circular passage Z serve as a resonance passage is defined, and another resonance supercharging effect is obtained at an engine speed $N_{R2}$ at which the pressure oscillation produced by the negative pressure wave generated in the intake stroke of each cylinder tunes to the natural frequency of the air column oscillation in the resonance space.

Generally the resonance tuning engine speed $N_R$ can be approximated according to the following formula.

$$N_R = 120/m \cdot a/2\pi \cdot \sqrt{[F/(L \cdot V)]}$$

wherein m represents the number of cylinders in each cylinder group, a represents the sonic speed (m/s), F represents the mean cross-sectional area (m$^2$) of the intake passage upstream of the circular passage Z, L represents the equivalent passage length (m) of the intake passage upstream of the circular passage Z, and V represents the effective volume (m$^3$) of the intake passage downstream of the circular passage Z.

Since the number of cylinders in each cylinder bank is three in this embodiment, the above formula can be rewritten as follows.

$$N_R = 40 \cdot a/2\pi \cdot \sqrt{[F/(L \cdot V)]}$$

When this formula is applied to the engine speed $N_{R2}$, the engine speed $N_{R2}$ can be approximated according to the following formula.

$$N_{R2} = 40 \cdot a/2\pi \cdot \sqrt{[3F/(Lo \cdot V)]}$$

Since f is approximate to F, the engine speed $N_{R2}$ is higher than the first inertia tuning engine speed $N_{I1}$.

Figure 4:
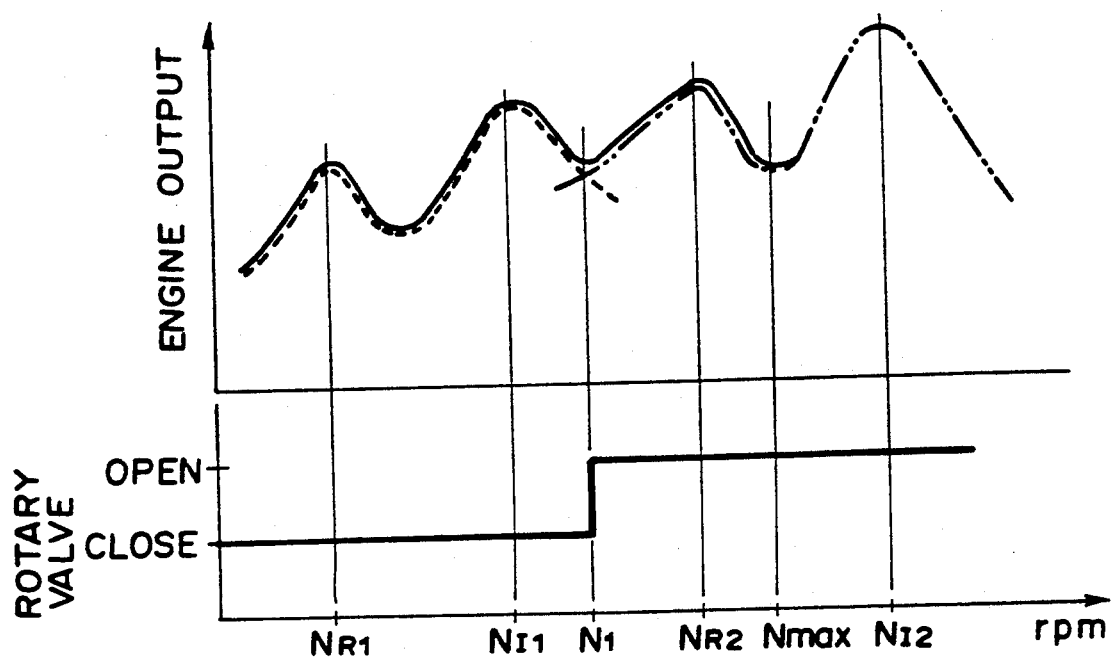
FIG. 4 is a view for illustrating the operation of the intake system.

Thus, a third peak appears in the engine output characteristic curve near the engine speed $N_{R2}$ as shown in FIG. 4. Since the length of the part of each discrete intake passage $3_1$ to $3_6$ downstream of the circular passage Z is set so that the second inertia tuning engine speed $N_{I2}$ at which the inertia supercharging effect related to the second resonance supercharging effect (that obtained at the engine speed $N_{R2}$) is obtained is higher than the maximum allowable engine speed Nmax, actually the peak due to the inertia supercharging effect at the second inertia tuning engine speed $N_{I2}$ does not appears.

In this particular embodiment, the equivalent length Lo of the part of the intake passage which joins the point P1 at which the second discrete intake passage $3_2$ is communicated with the circular passage Z and the point P2 at which the fifth discrete intake passage $3_5$ is communicated with the circular passage Z via the junction 4, the equivalent passage length L1 of the upper part of the circular passage Z and the equivalent passage length L2 of the lower part of the circular passage Z are equal to each other as described above. Accordingly, the resonance frequencies f(Lo), f(L$_1$) and f(L$_2$) are equal to each other and pressure waves propagate through the part of the intake passage between the points P1 and P2, the upper part of the circular passage Z and the lower part of the circular passage Z substantially in phase and are synthesized into larger combined pressure waves at points P1 and P2, whereby a resonance supercharging effect can be obtained more surely.

We claim:

1. An intake system for a multiple-cylinder engine having first and second groups of cylinders, the firing order being set so that the cylinders in each group do not fire one after another, said intake system comprising a first group of discrete intake passages which communicate with the respective cylinders in the first group at their downstream ends and with a first branch intake passage at their upstream ends, a second group of discrete intake passages which communicate with the respective cylinders in the second group at their downstream ends and with a second branch intake passage at their upstream ends, the first and second branch intake passages merging into a common intake passage which opens to the atmosphere at its upstream end, a circular passage which communicates with the discrete intake passages at their intermediate portions so that all the discrete intake passages communicate with each other through the circular passage, and an on-off valve means which opens to cause the discrete intake passages to communicate with the circular passage when the engine speed is higher than a predetermined value and closes to break the communication between the discrete intake passages and the circular passage when the engine speed is not higher than the predetermined value, the length of each discrete intake passage being such that a first inertia tuning is obtained at a first engine speed lower than a maximum allowable engine so long as the discrete intake passages are not communicated with the circular passage, and the length of the part of each discrete intake passage downstream of the circular passage being such that a second inertia tuning is obtained at a second engine speed higher than the maximum allowable engine so long as the discrete intake passages are communicated with the circular passage.

2. An intake system as defined in claim 1 in which said engine is a V-type engine having first and second cylinder banks, the cylinders in said first cylinder group being formed in a row in the first cylinder bank and the cylinders in said second cylinder group being formed in a row in the second cylinder bank, said first branch intake passage extends substantially in parallel to the cylinder rows above the second cylinder bank, said second branch intake passage extends substantially in parallel to the cylinder rows above the first cylinder bank, each of the discrete intake passages for the cylinders in the first cylinder bank extends from the first branch intake passage substantially horizontally toward the first cylinder bank and then curves downward toward the corresponding cylinder, and each of the discrete intake passages extends from the second branch intake passage substantially horizontally toward the second cylinder bank and then curves downward toward the corresponding cylinder.

3. An intake system as defined in claim 2 in which said circular passage extends substantially horizontally above the discrete intake passages and is connected to each discrete intake passage at the portion extending substantially horizontally from the corresponding branch intake passage.

4. An intake system for a multiple-cylinder engine having first and second groups of cylinders, the firing order being set so that the cylinders in each group do not fire one after another, said intake system comprising a first group of discrete intake passages which communicate with the respective cylinders in the first group at their downstream ends and with a first branch intake passage at their upstream ends, a second group of discrete intake passages which communicate with the respective cylinders in the second group at their downstream ends and with a second branch intake passage at their upstream ends, the first and second branch intake passages merging into a common intake passage which opens to the atmosphere at its upstream end, a circular passage which communicates with the discrete intake passages at their intermediate portions so that all the discrete intake passages communicate with each other through the circular passage, and an on-off valve means which opens to cause the discrete intake passages to communicate with the circular passage when the engine speed is higher than a predetermined engine speed and closes to break the communication between the discrete intake passages and the circular passage when the engine speed is not higher than the predetermined engine speed, the length of each of the discrete intake passages, the position of the junction at which the circular passage communicates with each of the discrete intake passage and said predetermined engine speed being set so that a first resonance tuning, an inertia tuning and a second resonance tuning are obtained in this order as the engine speed increases up to a maximum allowable engine.

* * * * *